Feb. 19, 1963   H. MULDER   3,078,124
WHEEL COVER

Filed May 25, 1960   3 Sheets-Sheet 1

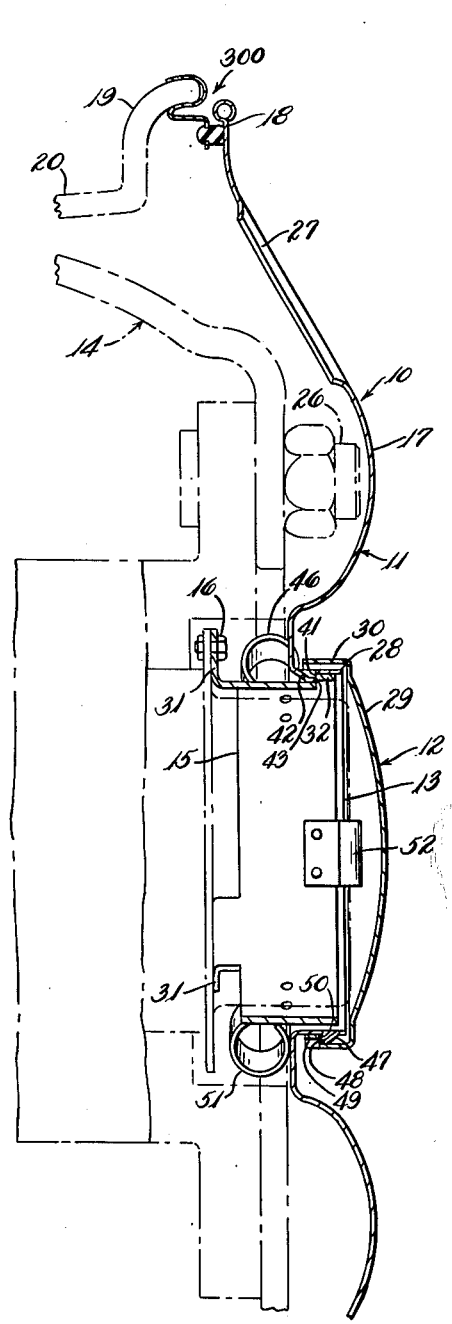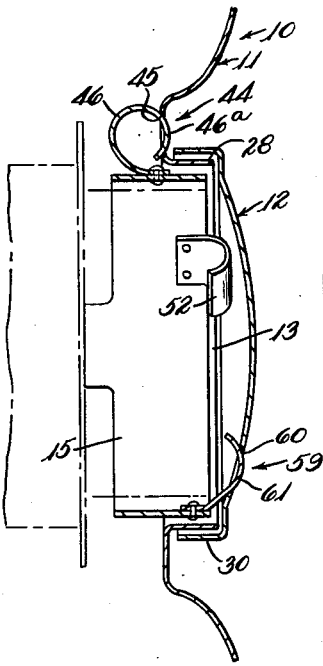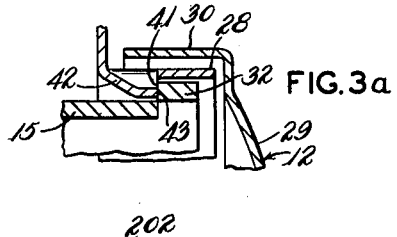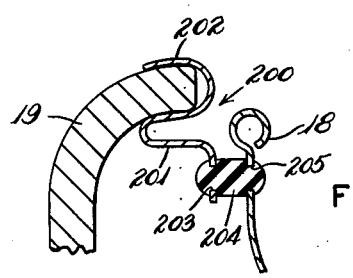
FIG. 3
FIG. 4
FIG. 3a
FIG. 9

Feb. 19, 1963  H. MULDER  3,078,124
WHEEL COVER
Filed May 25, 1960  3 Sheets-Sheet 3

3,078,124
WHEEL COVER

Harry Mulder, Akron, Ohio, assignor to The Firestone Tire & Rubber Company, Akron, Ohio, a corporation of Ohio Filed May 25, 1960, Ser. No. 31,778
12 Claims. (Cl. 301—37)

The invention relates generally to a protective cover for the outer sides of vehicle wheels.

One well known and generally used type of wheel cover is the so-called "snap-on and pry-off" type in which a resilient shoulder on the cover, for example, snaps over a flange or over protrusions on the wheel.

The cover of the present invention, however, departs from this usual type of snap-on fastening and is rotated in order to fasten it onto the wheel and is rotated in the opposite direction again in order to remove it from the wheel. The term wheel is herein used to denote generally the rotating unit comprising the wheel hub, the wheel disk and the rim carried on the disk.

More specifically, the wheel cover of the invention is designed to be used with an adapter fastened to and extending from the wheel. The wheel cover may be of unitary, reversible construction, or it may incorporate a cap member relatively movable with respect to the body of the wheel cover and fastened to it on the side opposite the adapter.

It is accordingly an important object of the present invention to provide an improved type of wheel cover having quick-mounting and dismounting features.

It is another object of the invention to provide a wheel cover which is rotated into positive, cammed engagement with an adapter for mounting and thus resists the tendency of the wheel cover to fly off or be pried off.

It is a further object of the present invention to provide a wheel cover which will effectively cover unsightly wheel lugs and which may be unitary and reversible, or which may be provided with a demountable second member which is removable for servicing of the wheel at the hub.

These and other objects of the present invention will become apparent from the following description and drawings of a preferred form of the invention in which:

FIGURE 3 is an enlarged fragmentary sectional view taken on line 3—3 of FIGURE 1.

FIGURE 3a is an enlarged fragmentary sectional view of the wheel cover locking mechanism.

FIGURE 4 is a sectional view taken on line 4—4 of FIGURE 2.

FIGURE 9 is an enlarged fragmentary sectional view showing a bumper means for the radially outer edge of the wheel cover.

Figure 1:
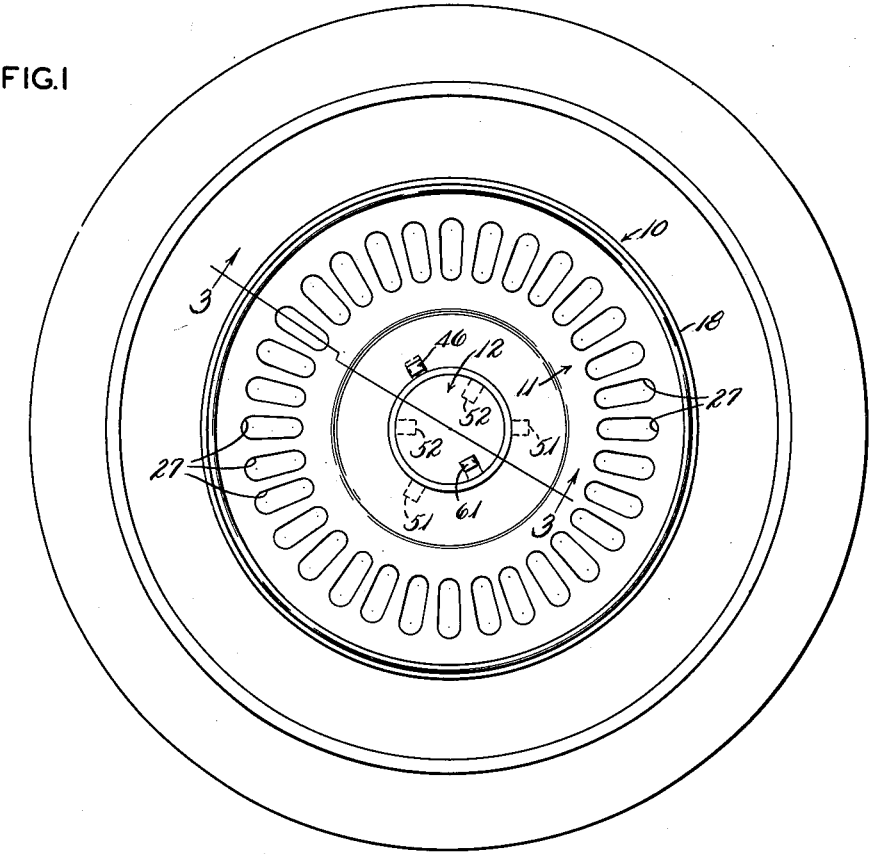
FIGURE 1 is a view of a tire and wheel incorporating the wheel cover of the invention.

The wheel cover 10 of the invention shown, for example, in FIGURE 3, comprises an annular dished member indicated generally at 11 and a cap member 12 adapted to fit over the central portion 13 of the annular member.

The annular member 11 and the cap member 12 are shown as carried on the wheel 14 by means of a cylindrical adapter 15 which is bolted as at 16 or fastened by other means to the wheel.

The annular member 11 comprises a dished body portion 17 terminating in an edge portion 18 adjacent the flange 19 of the rim 20 carried by the wheel.

The portion 17 is so curved as to clear the wheel lugs 26, and is provided with a series of circumferentially spaced flanged openings 27, which provide increased ventilation for the wheel.

The radially inner portion of the annular member 11 comprises an axially extending flange portion 28 which is provided with means to engage the adapter at the axially outer portion thereof. These fastening means will be described in greater detail subsequently.

The cap member 12 comprises a body portion 29 and an axially extending annular flange 30, which flange is provided with fastening means by which the cap may be placed in engagement with the flange 28 of the annual member 11. The flange 30 has a basic diameter which is greater than that of the flange 28 and is adapted to fit over it when the cap is placed in position.

It is to be noted that the annular member 11, the cap member 12 and the adapter 15 have similar types of fastening means. As is clearly seen in FIGURE 3, the annular member 11 engages the adapter, and the cap portion 12 is fastened to the annular portion.

In other words, the annular member 11 is an intermediate member which carries the cap member 12 and is itself carried by the adapter 15.

Turning now to the means of fastening the member together.

Figure 7:
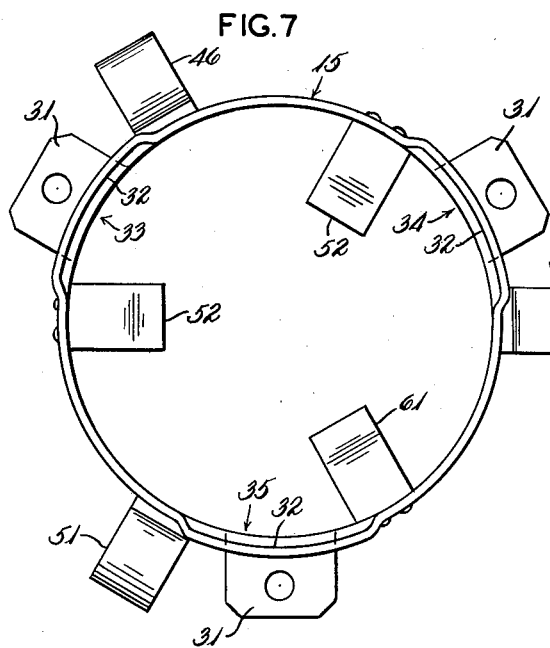
FIGURE 7 is a plan view of the adapter of FIGURE 2.
Figure 8:
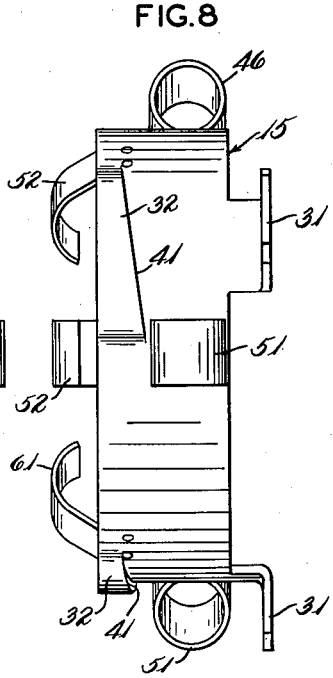
FIGURE 8 is a side elevation of the adapter of FIGURE 7.

As shown in FIGURE 7, the adapter 15 has a generally cylindrical configuration, and is provided with circumferentially spaced flanges 31 by which it is held on the wheel 14.

Near the free end of the adapter 15, a plurality of portions are struck radially from the circumference of the adapter, to form louvers 32. These louvers 32 extend circumferentially and lie on a circle concentric with the basic configuration of the adapter but of greater diameter. The particular modification described has three such areas indicated at 33, 34 and 35, but as many areas as are necessary for the secure fastening of the members may, of course, be provided.

The louvers 32 have a ramp portion designated by 41 which extends at an angle to the rotational plane of the wheel. The reason for these angular louvers will be more clearly understood as the specification proceeds.

The axially extending flange 28 of the annular member 11 likewise has a plurality of louvers 42 struck therefrom to form ramp portions 43, similar in shape and angularity to the ramps 41 struck out of the adapter 15. Preferably, the number of louvers struck from the adapter are identical to the number of louvers struck from the cylindrical flange 28 of the annular member.

Figure 2:
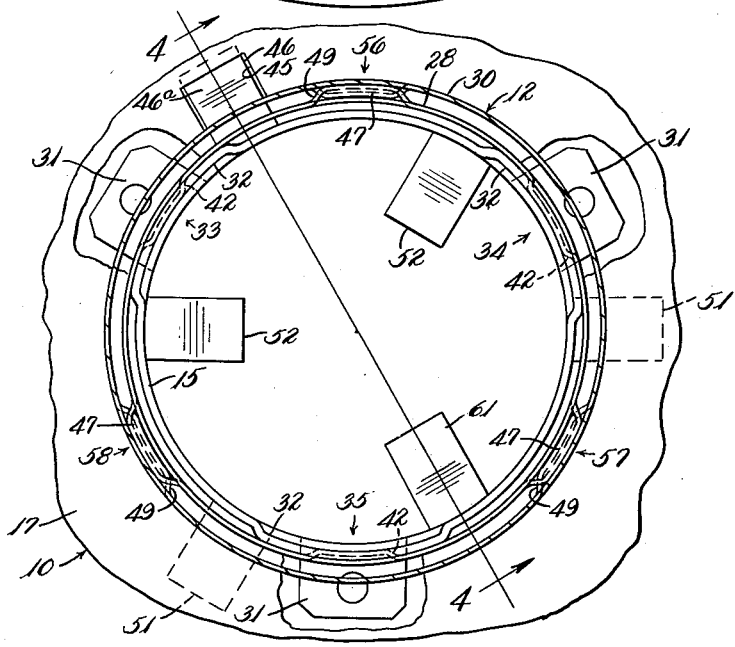
FIGURE 2 is an enlarged fragmentary view, partly broken away and in section, of the central portion of the wheel cover showing the locking mechanism and adapter.

It will be noted from FIGURES 2 and 3 that the louvers on the annual member and on the adapter, respectively, project in opposite radial directions. More specifically, the louvers 32 of the adapter 15 as shown in the present modification extend radially outwardly, while the louvers 42 in the annular member 11 are directed radially inwardly.

The basic diameter of the flange portion 28 of the annular member 11 is only slightly greater than the louver diameter of the adapter, so that the annular member 11 may be slid axially over the end of the adapter.

As the annular member, thereafter, is rotated in the circumferential direction, the radially inwardly directed louvers 42 of the annular member pass behind the radially outwardly directed louvers 32 of the adapter, whereby the angled ramps 41 and 43 progressively engage with cam action to make surface contact. To support the annular member axially and prevent rattling, I provide on the adapter circumferentially spaced springs 51 which resiliently engage the wall of the annular member. One of these springs acts as a lock.

In order to prevent the annular member 11 from rotating back out of its place on the adapter 15 once it has been rotated into engagement, there is provided a lock shown generally at 44. The locking mechanism comprises a slot 45 in the annular member, and a spring member 46 fastened to the adapter and having a forwardly curved portion 46a. The location of the spring 46 is such that, as the annular member 11 is rotated into position on the adapter, the slot 45 receives the curved portion 46a of the spring 46; the portion 46a is of a circumferential extent to substantially fill the slot and thus locks the annular member against further rotation.

Intermediate the louvers 42 in the annular member 11, there are provided oppositely extending louvers 47 similar in configuration to those hereinbefore described, and having angled ramp portions 48.

In the present modification three engaging areas 56, 57 and 58 for the annular member and the cap member 12 have been shown; the number of engaging portions may, of course, be chosen to provide a secure engagement.

At spaced areas about the circumference of the axial flange 30 on the cap member 12, the flange is struck radially inwardly to form projecting louvers 49 having angled ramp portions 50.

The basic diameter of the flange 30 of the cap member 12 is only slightly greater than the outer louver diameter of the annular member 11, so that the flange 30 of the cap member may be slid axially over the flange 28 of the annular member.

Once in place on the annular member, the cap is rotated circumferentially to bring the angled ramps surface 48 and 50 into progressive camming engagement, whereby the cap is secured on the annular member and axially against spring 52.

In order to prevent further movement of the cap member 12 after it has been rotated into place on the annular member 11, a locking arrangement 59 is provided. This lock comprises a slot 60 in the cap member, and a spring member 61 fastened on the radial flange of the adapter and having a curved portion adapted to receive the slot 60 in said cap. The spring member 61 again is so located that its forwardly curved portion will engage and substantially fill the opening in the cap, to lock it against further rotation.

Figure 5:
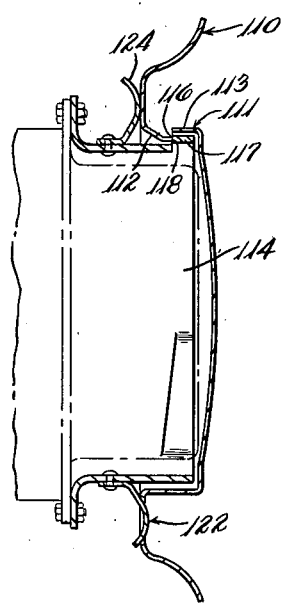
FIGURE 5 is a fragmentary sectional view of a modification of the invention.
Figure 6:
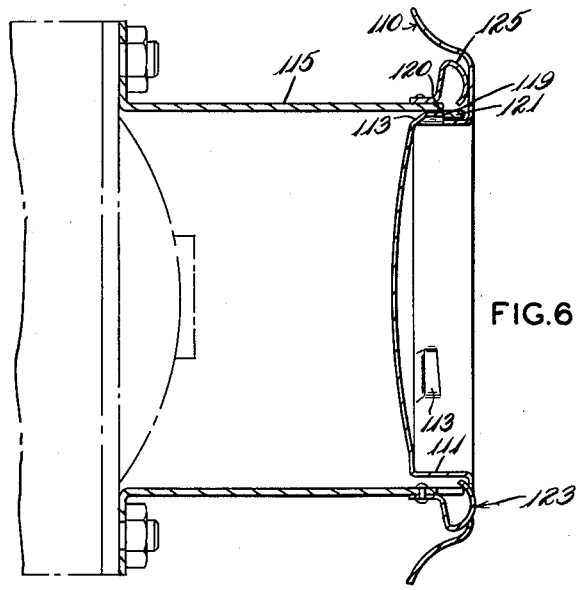
FIGURE 6 is a fragmentary sectional view showing the wheel cover of FIGURE 5 in a different position.

In FIGURES 5 and 6 are shown a modification of the present invention utilizing the same principle of dual attachment louvers on the wheel cover as above, but in conjunction with a reversible unitary wheel cover construction.

In this modification, the wheel cover comprises a single disk 110 having in main the same shape as that described above. The cylindrical flange 111 of the wheel cover of this modification is provided with radially inwardly projecting louvers 112 alternating about the circumference of the flange 111 with radially outwardly projecting louvers 113, these louvers being of substantially the type hereinbefore described.

In the modification of FIGURES 5 and 6, however, the wheel cover 110 is adapted not only to engage the adapter 114 shown in FIGURE 5; further, this same wheel cover 110 may be reversed to engage different adapter 115.

It is contemplated in this connection that the angled ramp portions 118 of the louvers 112 on wheel cover 110 will cammingly engage the adapter 114 by the angled ramp portions 116 on louvers 117, and will be held axially by springs 124.

Alternatively, the angled ramp portions 119 on the radially outwardly extending louvers 113 of the wheel cover 110 are adapted to cammingly engage the angled ramp portions 120 of the louvers 121, on adapter 115, and will be held axially by springs 125.

In either case, the fastening of the wheel cover to the adapter takes place by rotating the cover until the angled ramp portions on cover and adapter progressively engage.

Lock means for both adapters are indicated, respectively, at 122 and 123 and are similar to those described above, taking the form of a spring member fastened on the adapter and engaging a slot in the wheel cover 110.

A further modification of the present invention is shown in FIGURE 9, in which a plurality of bumper means has been provided at the radially outer edge 18 of the wheel cover. The advantage of a bumper means of this type is that it isolates the rim flange from the edge of the wheel cover, thus preventing metal-to-metal contact of the two and the resulting squeaks.

As shown at 200 in FIGURE 9, the bumper takes the general form of a resilient clip 201. The clip has a portion 202 generally conforming to the shape of the rim flange 19 so that it may be retained thereon with a press fit. Inwardly of the flange-engaging portion 202 the clip is provided with an opening 203 in which is held a rubber bumper 204. The outer end of the rubber member 204 is held in an opening 205 near the marginal edge 18 of the wheel cover.

The bumper means may be attached to the rim flange without being a portion of the wheel cover, such as shown, for example, in FIGURE 3, in which clip 300 is separate from the wheel cover edge 18.

Although preferred forms of the invention have been disclosed herein, various modifications will occur to those skilled in the art, without departing from the scope of the invention, the essential features of which are summarized in the appended claims.

What is claimed is:

1. The combination comprising a vehicle wheel, an adapter on said wheel, a wheel cover on said wheel, said wheel cover comprising an annular member engaging said adapter and a cap member engaging said annular member, a plurality of first means on said annular member and on said adapter projecting, respectively, in opposite radial directions and releasably fastening said annular member to said adapter, and second means on said annular member and on said cap member extending, respectively, in opposite radial directions and releasably fastening said cap member to said annular member.

2. The combination of claim 1 and means on said adapter and on said annular member and said cap, respectively, for securing said annular member and said cap member against relative rotation in the fastened condition.

3. The combination of claim 1, wherein said plurality of first means comprises radially inwardly extending louvers on said annular member and radially outwardly extending louvers on said adapter, and wherein said second means comprises radially outwardly extending louvers on said annular member and radially inwardly extending louvers on said cap member.

4. The combination of claim 3, wherein said radially inwardly and radially outwardly extending louvers on said annular member alternate.

5. The combination comprising a vehicle wheel, an adapter on said wheel, a wheel cover carried by said adapter, radially oppositely projecting means on said wheel cover and on said adapter releasably fastening said wheel cover and said adapter together, and resilient means on said adapter urging said wheel cover and said adapter axially apart.

6. The combination comprising a vehicle wheel, an adapter on said wheel, a wheel cover carried by said adapter, and means radially struck from said wheel cover and from said adapter and extending, respectively, in opposite radial directions, said radially struck means releasably fastening said wheel cover and said adapter together.

7. The combination of claim 6, wherein said radially struck means are circumferentially spaced.

8. The combination of claim 6, wherein said radially struck means extend at angles to the plane of said wheel.

9. The combination of claim 6, and resilient bumper means between said wheel and said cover.

10. The combination comprising a vehicle wheel, an adapter on said wheel, a wheel cover carried by said adapter, and means radially struck from said wheel cover and from said adapter and projecting radially outwardly and radially inwardly, respectively, said radially struck means releasably fastening said wheel cover and said adapter together.

11. The combination comprising a vehicle wheel, an adapter on said wheel, a wheel cover carried by said adapter, and means radially struck from said wheel cover and from said adapter and projecting radially inwardly and radially outwardly, respectively, said radially struck means releasably fastening said wheel cover and said adapter together.

12. The combination comprising a vehicle wheel, an adapter on said wheel, a wheel cover carried by said adapter, circumferentially spaced means struck radially from said wheel cover and from said adapter and projecting, respectively, in opposite radial directions and releasably fastening said wheel cover and said adapter together, and means for securing said wheel cover and said adapter against relative rotation in the fastened condition.

References Cited in the file of this patent

UNITED STATES PATENTS

| | | |
|---|---|---|
| 1,821,137 | Bostock | Sept. 1, 1931 |
| 2,016,395 | Sinclair | Oct. 8, 1935 |
| 2,129,115 | Best | Sept. 6, 1938 |
| 2,291,597 | Goeske | Aug. 4, 1942 |
| 2,751,256 | Adams | June 19, 1956 |
| 2,847,252 | Lyon | Aug. 12, 1958 |
| 2,869,929 | Hurd | Jan. 20, 1959 |
| 2,963,323 | Lyon | Dec. 6, 1960 |

FOREIGN PATENTS

| | | |
|---|---|---|
| 446,233 | Canada | Jan. 20, 1948 |